US 9,584,715 B2

(12) United States Patent
Equitz et al.

(10) Patent No.: US 9,584,715 B2
(45) Date of Patent: Feb. 28, 2017

(54) VISION SYSTEM WITH SWAPPABLE CAMERA HAVING AN ALIGNMENT INDICATOR, AND METHODS OF MAKING AND USING THE SAME

(71) Applicant: Cognex Corporation, Natick, MA (US)

(72) Inventors: William H. Equitz, Portland, OR (US); Paul Burrell, Wilsonville, OR (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/623,316

(22) Filed: Feb. 16, 2015

(65) Prior Publication Data

US 2016/0241771 A1 Aug. 18, 2016

(51) Int. Cl.
*H04N 17/00* (2006.01)
*H04N 5/232* (2006.01)
*H04N 5/225* (2006.01)
*H04N 5/341* (2011.01)

(52) U.S. Cl.
CPC ....... *H04N 5/23209* (2013.01); *H04N 5/2252* (2013.01); *H04N 5/341* (2013.01); *H04N 17/002* (2013.01); *H04N 2201/02483* (2013.01)

(58) Field of Classification Search
CPC ............. H04N 5/23209; H04N 5/2252; H04N 5/2254; H04N 5/341; H04N 2201/02483
See application file for complete search history.

(56) References Cited

U.S. PATENT DOCUMENTS

| 6,628,339 B1* | 9/2003 | Ferland | H04N 5/2253 257/433 |
|---|---|---|---|
| 2003/0019931 A1* | 1/2003 | Tsikos | G02B 26/10 235/454 |
| 2004/0048507 A1* | 3/2004 | Hage | G08B 13/19619 439/332 |
| 2006/0216019 A1* | 9/2006 | Thompson | F16M 11/10 396/427 |
| 2014/0010353 A1* | 1/2014 | Lalena | A61B 6/465 378/98 |
| 2014/0193144 A1* | 7/2014 | Coster | F16M 11/045 396/325 |
| 2015/0309295 A1* | 10/2015 | Cocker | G03B 17/02 600/476 |

* cited by examiner

Primary Examiner — Paulos M Natnael
Assistant Examiner — Sean Haiem
(74) *Attorney, Agent, or Firm* — Quarles & Brady LLP

(57) ABSTRACT

Vision systems including a swappable camera and methods of making and using the swappable camera are disclosed. The swappable camera can include an alignment indicator storing alignment data representative of an array-housing alignment of a sensor array relative to a camera housing. The swappable camera can have a desired sensor array position. A region of interest that is concentric with the desired sensor array position can be determined using the alignment data and an image can be acquired using only pixels of the sensor array that are located within the region of interest.

22 Claims, 7 Drawing Sheets

VISION SYSTEM WITH SWAPPABLE CAMERA HAVING AN ALIGNMENT INDICATOR, AND METHODS OF MAKING AND USING THE SAME

CROSS-REFERENCE TO RELATED APPLICATIONS

N/A

BACKGROUND

The present technology relates to vision systems, and more specifically, to a vision system with a swappable camera.

In a vision system with a swappable camera, in many situations, it is important that the camera remains aligned at a target when the camera is swapped for a replacement camera. In other words, the optical axis of a camera relative to the mounting points ought to be pointed precisely and repeatedly from camera to camera. It is known that the camera housing for a swappable camera can be reproducibly oriented within a vision system by way of a mounting system (i.e., the camera housing can be reproducibly pointed in the same direction upon swapping). It is also known that the lenses of a camera can be reproducibly oriented relative to the camera housing by way of the design of the camera housing even at a high manufacturing rate (i.e., the lenses can be positioned relative to the camera housing such that the image projection is reproducibly located within the camera housing). However, these steps are not sufficient unless one can also reproducibly align an image sensor chip or sensor array therein relative to the camera housing and lenses, and this needs to be done at a reasonable cost when manufacturing at a high rate of speed and in volume. Presently, there are several strategies for overcoming this difficulty in alignment, but each of the existing strategies has significant shortcomings.

One option known in the art is careful physical alignment during manufacture. At the time of manufacturing, a user can physically align a sensor assembly within a camera housing to compensate for any stack-up tolerance from the sensor chip, or other misalignments. However, this careful physical alignment slows the manufacturing process, and therefore increases the cost associated with manufacturing.

A second option known in the art is to mount the camera to an external correction stage and manually compensate for any tolerance variations in the camera. This requires additional time for the user during the camera swapping process. Also, the external correction stage is an additional expense to the overall system.

A third option known in the art is to accept the inherent variations from a high-speed manufacturing process and design a system having a camera field-of-view that is large enough to allow for sensor tolerances and a system that functions based on finding a reference object and fixturing tools to the location of the object. However, in systems where reference objects are not available, this sort of a system is not capable of proper alignment.

Finally, a fourth option known in the art is to do application-level calibration and do all computations using "real-world" coordinates. See, for example, Tsai, R. Y., "A Versatile Camera Calibration Technique for High-Accuracy 3D Machine Vision Metrology Using Off-the-Shelf TV Cameras and Lenses", IEEE Journal of Robotics and Automation, Vol. RA-3, No. 4, August 1987. However, this option has significant computational demands that increase the cost and time to set up.

Therefore, what is needed is a vision system with a swappable camera where the swappable camera can be manufactured at a high rate of speed and at low cost, thus enabling use of cameras that are not perfectly aligned.

BRIEF SUMMARY OF THE INVENTION

The present embodiments overcome the aforementioned problems by providing a vision system with swappable camera having an alignment indicator and methods of making and using the same.

In one aspect, this disclosure provides a vision system. The vision system can include an image processor and a swappable camera. The swappable camera can include a camera housing, an optical arrangement, and an alignment indicator. The optical arrangement can include a sensor array. The sensor array can be electronically coupled to the image processor. The alignment indicator can store alignment data representative of an array-housing alignment of the sensor relative to the camera housing.

In another aspect, this disclosure provides a method of replacing a first swappable camera with a second swappable camera. The second swappable camera can include a camera housing, a sensor array, and an alignment indicator. The alignment indicator can store alignment data representative of an array-housing alignment of the sensor array relative to a desired sensor array position within the camera housing. The sensor array can be offset by at least one pixel from the desired sensor array position. The method can include one or more of the following steps: removing the first swappable camera; positioning the second swappable camera with a location and orientation of the first swappable camera prior to the removing; determining a region of interest that is concentric with the desired sensor array position using the alignment data; and acquiring an image using only pixels of the sensor array that are located within the region of interest.

In yet another aspect, this disclosure provides a method of making a swappable camera. The swappable camera can include a camera housing having a desired sensor array location. The method can include one or more of the following steps: positioning a sensor array within the camera housing; measuring an alignment of the sensor array relative to the desired sensor array location; and recording the alignment as alignment data to an alignment indicator of the swappable camera. Positioning the sensor array within the camera housing can be performed in a manufacturing process that positions the sensor array within the camera housing with a manufacturing variance of at least about 50 µm.

To the accomplishment of the foregoing and related ends, the embodiments, then, comprise the features hereinafter fully described. The following description and annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
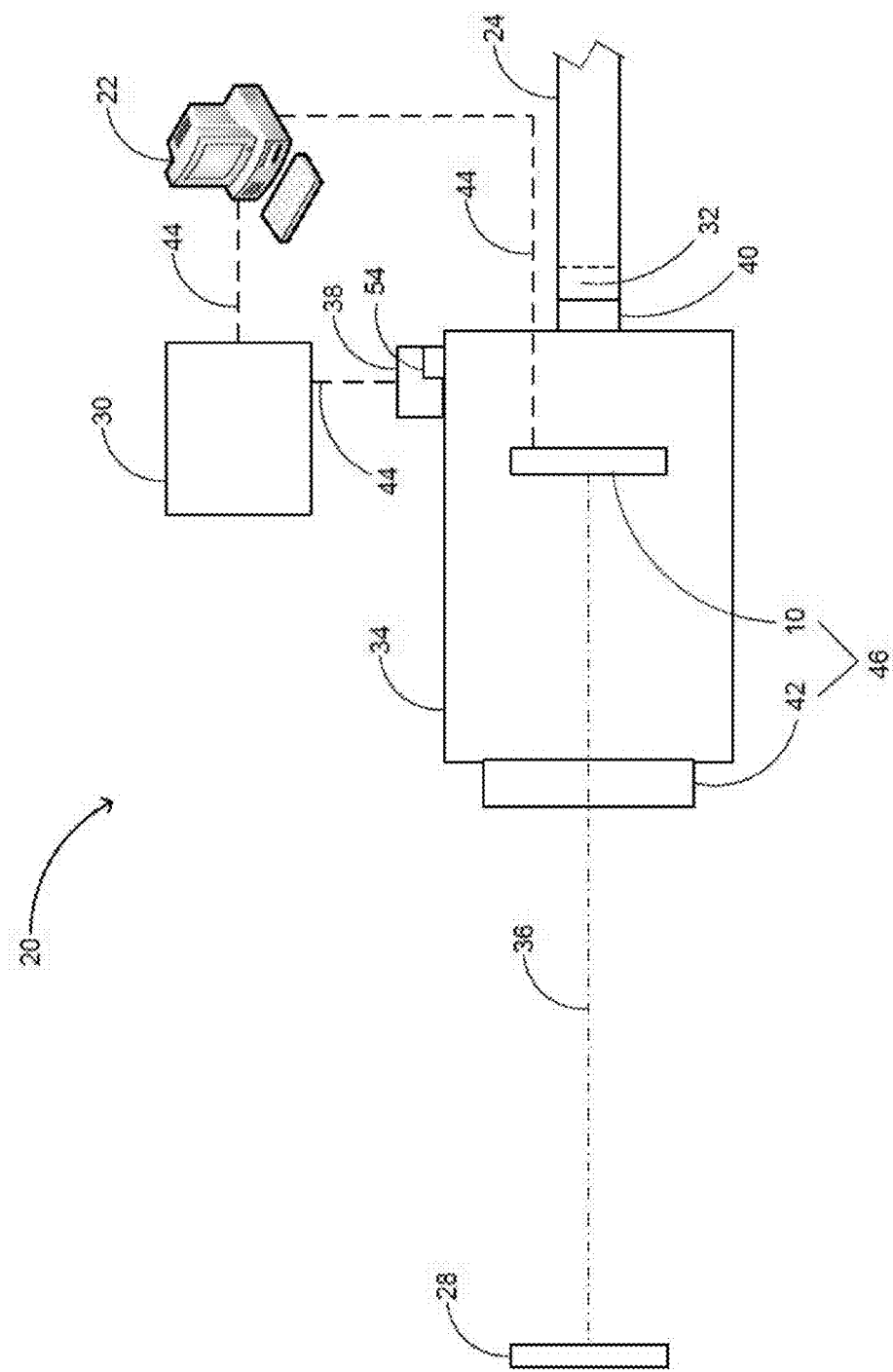
FIG. 1 is a schematic view of a vision system, according to embodiments of this disclosure.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE INVENTION

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope.

Vision System

Figure 2:
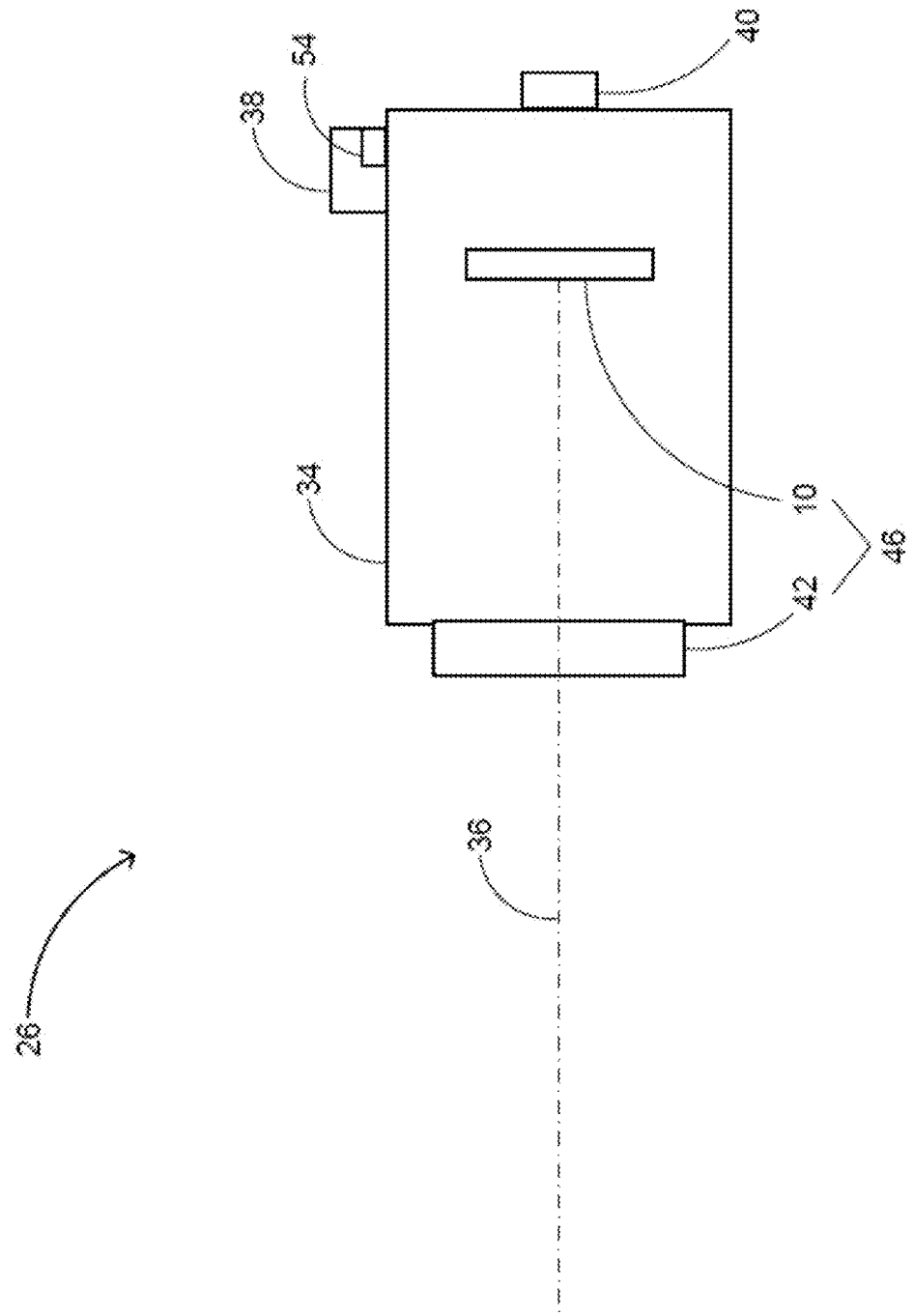
FIG. 2 is a schematic view of a swappable camera, according to embodiments of this disclosure.

Referring to FIGS. 1 and 2, this disclosure provides a vision system 20. The vision system 20 can include an image processor 22, a mount 24, a swappable camera 26, and an image target 28. The vision system 20 can also include an alignment indicator reader 30.

The image processor 22 can receive various user inputs and instructions, can direct the swappable camera 26 to perform certain functions, can direct the acquisition of images, and can receive image data and perform various operations on the image data. The image processor 22 can be located within the swappable camera 26 or remote from the swappable camera 26.

The swappable camera 26 can include a sensor array 10, a camera housing 34, an optical arrangement 46, and a primary optical axis 36. The swappable camera 26 can include an alignment indicator 38, which can include a memory containing alignment data 54 regarding the alignment of certain aspects of the swappable camera 26, in particular, the alignment offset of a sensor array 10 relative to the camera housing 34. The sensor array 10 can include a plurality of pixels, as is known in the art, such as 5 megapixels, although more or less are contemplated. The sensor array 10 can be connected to the processor 22 by a communication line 44, which encompasses physical and wireless communication lines 44.

The mount 24 can include a mount-side mounting contact 32. In certain embodiments, the mount 24 can include multiple mount-side mounting contacts 32. The mount-side mounting contact 32 can interface with the swappable camera 26 to reproducibly position the swappable camera 26.

The camera housing 34 can include a camera-side mounting contact 40. The camera-side mounting contact 40 can couple with the mount-side mounting contact 32 to reproducibly position the swappable camera 26 so a desired central array point 12 or a desired sensor array location 18 (shown in FIGS. 3-6) is located in substantially the same location before and after swapping the swappable camera 26. The camera-side mounting contact 40 can couple with the mount-side mounting contact 32 to reproducibly position and orient the camera housing 34 before and after swapping the swappable camera 26. The camera-side mounting contact 40 can couple with the mount-side mounting contact 32 so the primary optical axis 36 is accurately pointed toward the image target 28 before and after swapping the swappable camera 26. Referring to FIG. 7, the camera housing 34 can define a housing angle 50 defining the rotational orientation of the camera housing 34 about the primary optical axis 36. The camera-side mounting contact 40 can couple with the mount-side mounting contact 32 to reproducibly orient the swappable camera 26 so the housing angle 50 is substantially the same before and after swapping the swappable camera. In certain embodiments, the camera housing 34 can include multiple camera-side mounting contacts 40.

The camera housing 34 can include a desired sensor array position 18. The desired sensor array position 18 is a user-defined location for the sensor array 10 and can be located anywhere within the camera housing 34 that is useful for acquiring an image with the sensor array 10. The desired sensor array position 18 is the location within the camera housing 34 where, if the sensor array 10 is positioned at the desired sensor array position 18, an image can be taken with the full field of view of the sensor array 10 before and after swapping the swappable camera 26 for a replacement swappable camera 26. In certain embodiments, the desired sensor array position 18 can be the position within the camera housing 34 where a sensor array 10 can be positioned to be centered about the primary optical axis 36 and at an angle such that the full field of view can be used to reproducibly produce an image of the image target 28.

The desired sensor array position 18 can include a desired central array point 12 (shown in FIGS. 3-6 and discussed below). The desired central array point 12 can be oriented along the primary optical axis 36.

Figure 8:
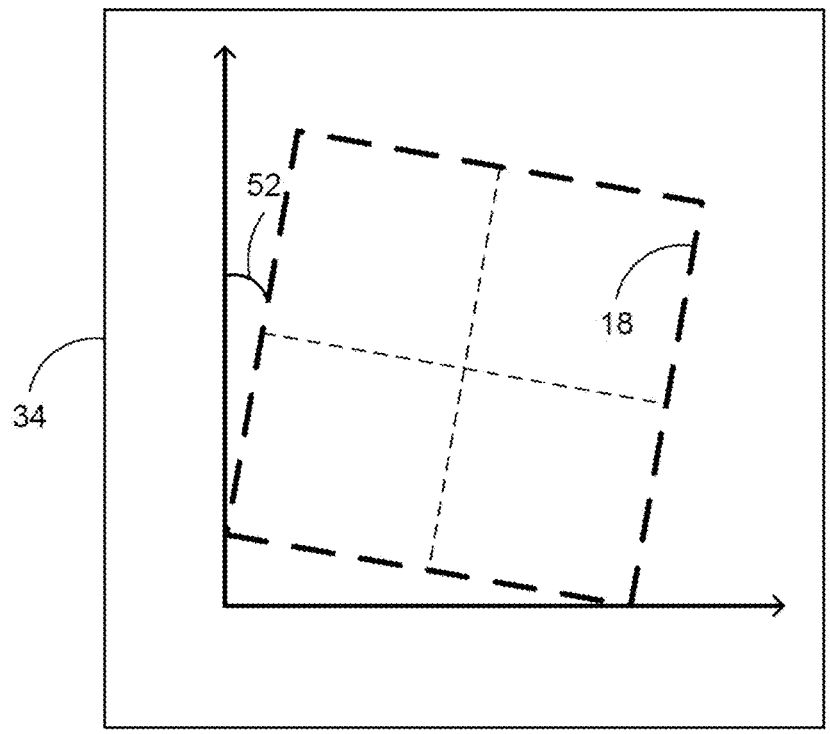
FIG. 8 is a schematic view of a sensor array showing a desired array angular orientation relative to a camera housing, according to embodiments of this disclosure.

Referring to FIG. 8, the desired sensor array position 18 can include a desired array angular orientation 52, which is the angular orientation of the desired sensor array position 18 relative to the camera housing 34. It should be appreciated that not all arrays would have an angular orientation dependence (for example, a circular array with a significant number of pixels would not have an angular orientation dependence), but the most common sensor array shapes are rectangular, so the angular orientation dependence can have a strong impact on the alignment of pixels of the sensor array 10. Additionally, it should be appreciated that some arrays would have varying degrees of symmetry based on their shape (for example, a square array has 90° symmetry while a rectangular array has 180° symmetry). In most instances, the desired array angular orientation 52 would be zero degrees.

In many instances, a camera can be configured so that the field of view is larger than an area that need to be inspected, and this can be advantageously used to compensate for camera alignment variations. As used herein, "region of interest" refers to a subset of a field of view which includes an area that the vision system 10 will analyze. The region of interest 16 (shown in FIGS. 4-6 and discussed below) can be centered about the desired central array point 12. The region of interest 16 can be determined by the image processor 22 using the alignment data 54 stored in the alignment indicator 38. The region of interest 16 can be determined by maximizing use of the pixels of the sensor array 10 located within the region of interest 16. In certain embodiments, the size of the region of interest 16 can be determined before the time of swapping the swappable camera 26 and can be looked up from a table or the like stored in memory where the alignment data 54 is correlated with a particular region of interest 16. In certain embodiments, the region of interest 16 can be determined at the time of swapping the swappable camera 26 or shortly thereafter and is calculated using an algorithm, such as an algorithm that maximizes the area of the region of interest 16 (for example, by ensuring that the difference between the area of the region of interest 16 and the area of the full sensor array 10 is greater than or equal to the difference between the area of any other possible region of interest 16 and the area of the full sensor array 10).

The sensor array 10 can include a central sensor point 14 (shown in FIGS. 3-6 and discussed below). The central sensor point 14 is a point that is located at the center of the sensor array 10. In embodiments where the sensor array 10 is rectangular in shape, the central sensor point 14 is located at the mid-point of one edge of the rectangular shape and the mid-point of an adjacent edge of the rectangular shape.

The optical arrangement 46 can further include the sensor array 10 and a lens assembly 42. The lens assembly 42 can be coupled to the camera housing 34. The lens assembly 42 can include one or more lens, an external focal length, an internal focal length, or a combination thereof.

The optical arrangement 46 can further include other optical components, such as filters, apertures, shutters, optical choppers, and the like.

The alignment data 54 can be representative of an array-housing alignment of the sensor array 10 relative to the camera housing 34. In certain embodiments, the alignment data 54 can be representative of an alignment of the sensor array 10 relative to the desired sensor array position 18. In certain embodiments, the alignment data 54 can be representative of an alignment of the central sensor point 14 relative to the desired central array point 12.

The alignment data 54 can include an offset value representing a sensor offset of the sensor relative to a desired sensor alignment. The offset value can include a central point offset representative of the distance between the central sensor point 14 and the desired central array point 12. The sensor offset or central point offset can include an offset distance, an offset direction, or a combination thereof. The central point offset can be expressed as a number of pixels, an x-y coordinate, or a combination thereof, such as 35 pixels in the x direction and 50 pixels in the y direction.

The alignment data 54 can include an angular alignment value. The angular alignment value can include a sensor angle 48 of the sensor array 10 relative to the desired sensor array position 18 (see, FIG. 6).

The alignment data 54 can be stored in a medium, such as the alignment indicator 38, in ways known to those having ordinary skill in the art. For example, the alignment data 54 can be stored in memory.

In certain embodiments, the region of interest 16 can be determined by maximizing the size of the region of interest 16, while maintaining the region of interest 16 centered about the desired central array point 12.

In certain embodiments, the primary optical axis 36 can originate at the desired central array point 12 and can project from the camera housing 34 in a direction from which an image is to be acquired. The vision system 20 can be configured such that the primary optical axis 36 is in line with the image target 28, the lens assembly 42, and the sensor array 10.

The alignment indicator reader 30 can identify and interpret the alignment data 54 from the alignment indicator 38. In embodiments where the alignment data 54 is stored in memory, the alignment indicator reader 30 can be a reader capable of reading memory. The alignment indicator reader 30 can be connected to the alignment indicator 38 by a communication line 44, which encompasses physical and wireless communication lines 44. The alignment indicator reader 30 can be connected to the image processor 22 by a communication line 44, which encompasses physical and wireless communication lines 44.

In certain embodiments, the image processor 22 or alignment indicator reader 30 can identify the alignment data 54 from the alignment indicator 38. In certain embodiments, the image processor 22 of alignment indicator reader 30 can interpret the alignment data 54 to provide the array-housing alignment. In certain embodiments, the alignment indicator reader 30 can be integrated within the image processor 22.

Figure 3:
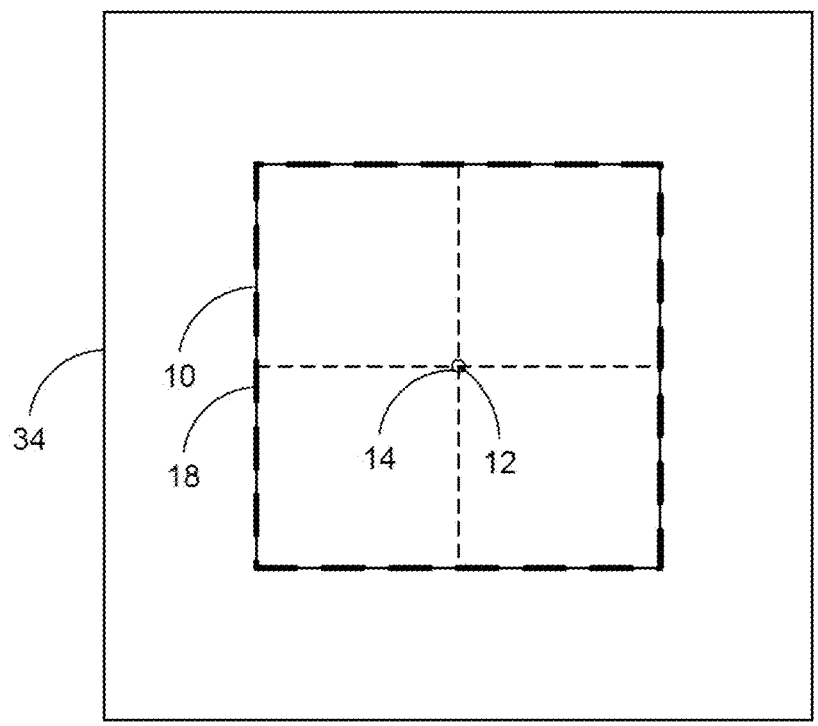
FIG. 3 is a schematic view of a portion of a vision system showing an aligned sensor array, according to embodiments of this disclosure.

Referring to FIG. 3, a sensor array 10 is shown aligned with the desired sensor array position 18 (i.e., the sensor array 10 is coextensive with the desired sensor array position 18, the central sensor point 14 is coextensive with the desired central array point 12, and the sensor array 10 is centered about the desired central array point 12).

Figure 4:
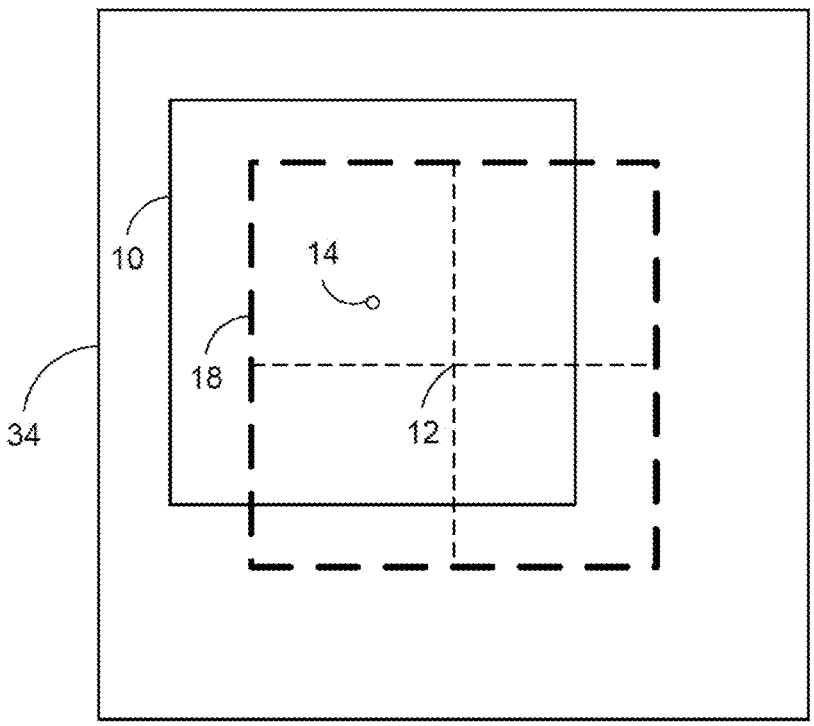
FIG. 4 is a schematic view of a portion of a vision system showing a misaligned sensor array, according to embodiments of this disclosure.

Referring to FIG. 4, a sensor array 10 is shown misaligned with the desired sensor array position 18 (i.e., the sensor array 10 is not coextensive with the desired sensor array position 18, the central sensor point 14 is not coextensive with the desired central array point 12, and the sensor array 10 is not centered about the desired central array point 12).

Figure 5:
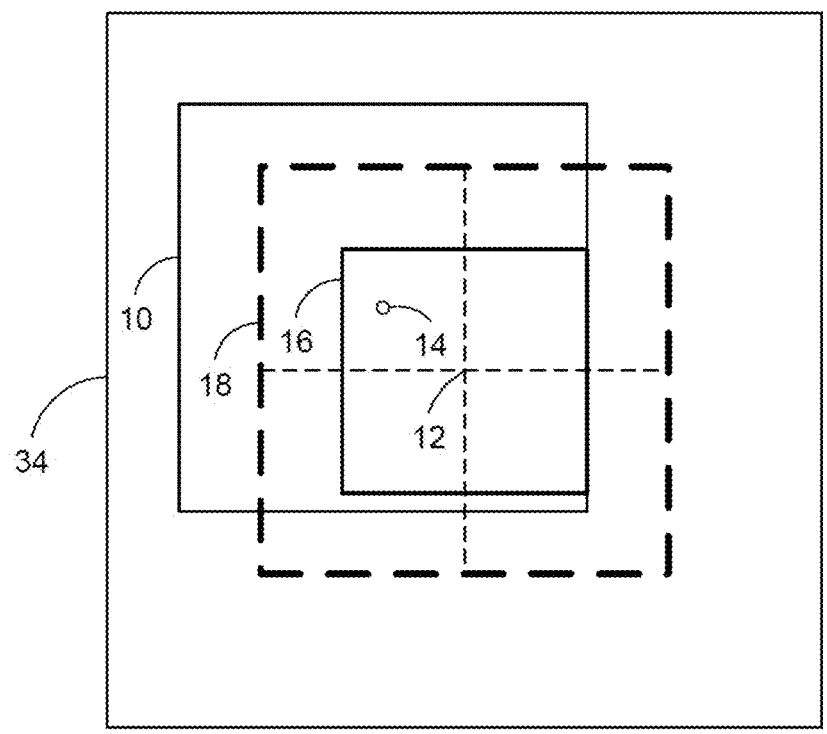
FIG. 5 is a schematic view of a portion of a vision system showing a misaligned sensor array with an aligned region of interest, according to embodiments of this disclosure.

Referring to FIG. 5, a sensor array 10 is shown misaligned with the desired sensor array position 18 and the sensor array 10 has a region of interest 16 that is centered about the desired central array point 12 (i.e., the sensor array 10 is not coextensive with the desired sensor array position 18, the central sensor point 14 is not coextensive with the desired central array point 12, but the region of interest 16 is centered about the desired central array point 12 despite the sensor array not being centered about the desired central array point 12).

Figure 6:
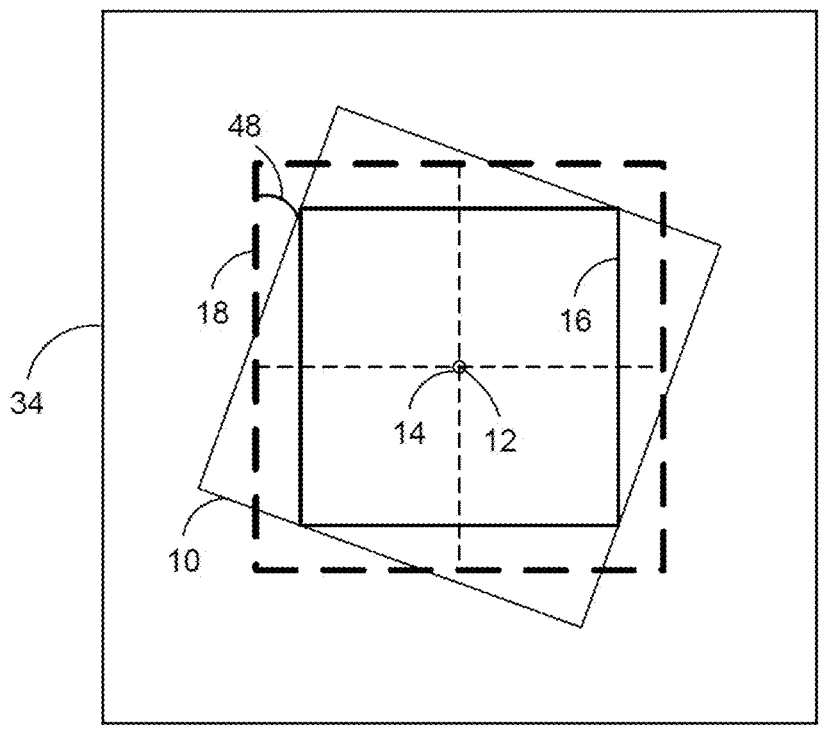
FIG. 6 is a schematic view of a portion of a vision system showing a misaligned sensor array with an aligned region of interest, according to embodiments of this disclosure.
Figure 7:
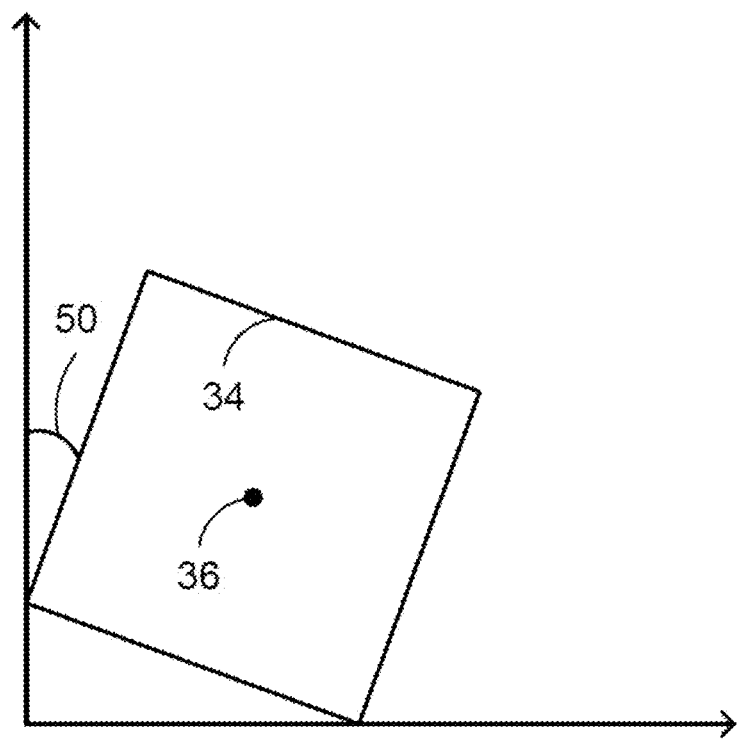
FIG. 7 is a schematic view of a camera housing showing a housing angle about the primary optical axis, according to embodiments of this disclosure.

Referring to FIG. 6, a sensor array 10 is shown angularly misaligned with the desired sensor array position 18 and the sensor array 10 has a region of interest 16 that is centered about the desired central array point 12 and is concentric with the desired sensor array position 18 (i.e., the sensor array 10 is not coextensive with the desired sensor array position 18, the sensor angle 48 is not zero or a multiple of the angular symmetry of the sensor array 10, but the central sensor point 14 is coextensive with the desired central array point 12, the region of interest 16 is centered about the desired central array point 12, and the region of interest 16 is concentric with the desired sensor array position 18).

The image processor 22 can determine a region of interest 16 of the sensor array 10 using the alignment data 54 stored in the alignment indicator 38. In certain embodiments, the image processor 22 can acquire an image of the image target 28 using an auto-aligned mode wherein the image is acquired using only pixels located within the region of interest 16 of the sensor array 10. In certain embodiments, the image processor 22 can acquire an image of the image target 28 using other image modes wherein the image is acquired using pixels located within, outside, or within and outside the region of interest 16 of the sensor array 10. In certain embodiments, the image processor 22 can be operable to switch between the auto-aligned mode and the other image modes. In certain embodiments, the image processor 22 can switch between the auto-aligned mode and the other image modes based on the alignment data 54.

In certain embodiments, the vision system 20 described herein does not require manual alignment when swapping swappable cameras 26. In certain embodiments, the vision system 20 described herein does not require an external correction stage for manually compensating for tolerance variations. In certain embodiments, the vision system 20 described herein does not require computationally expensive image post-processing.

Features of the methods 200, 300 described herein are applicable to the vision system 20.

Method of Replacing a First Swappable Camera with a Second Swappable Camera

Figure 9:
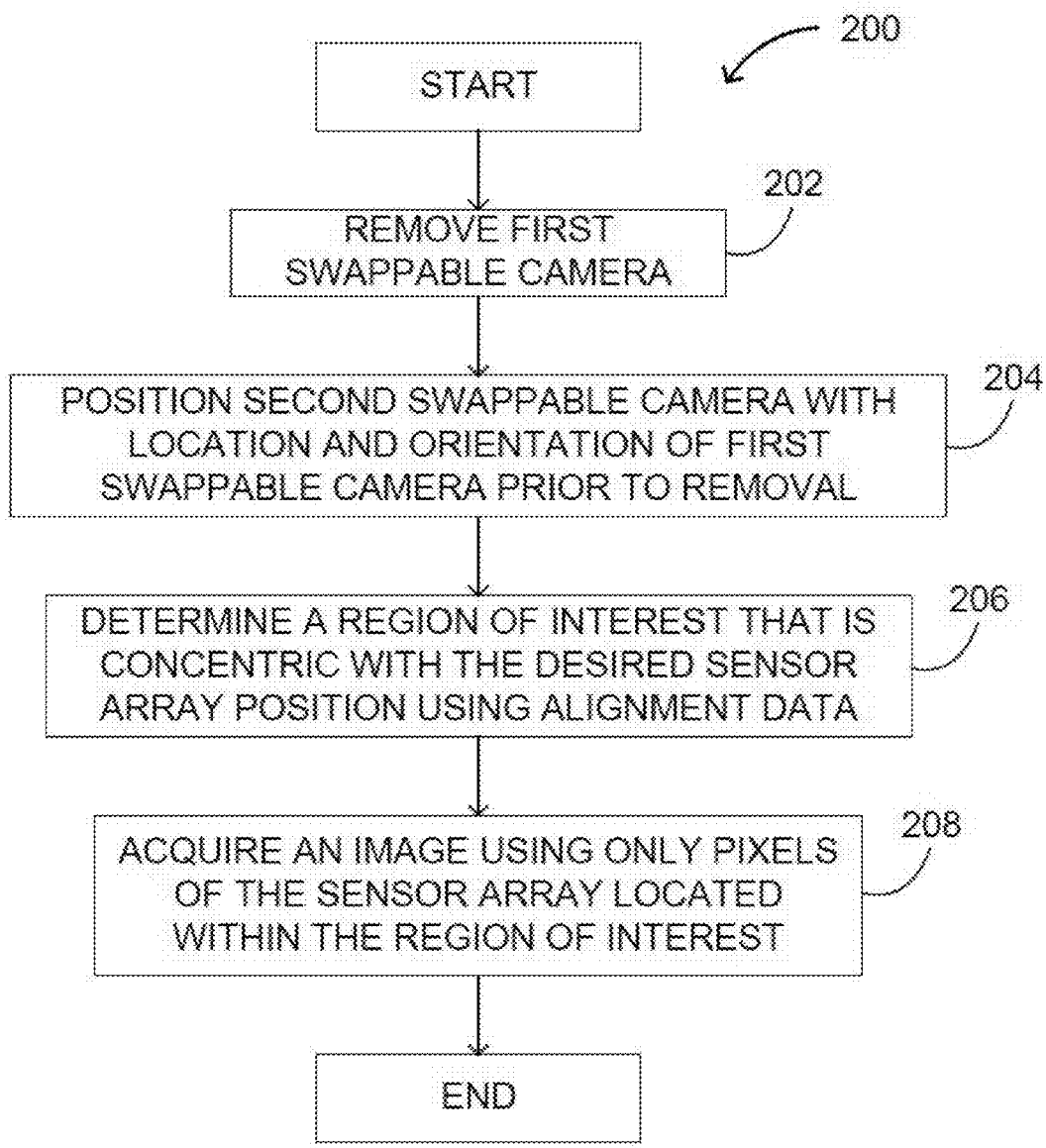
FIG. 9 is a flowchart showing a method of replacing a first swappable camera with a second swappable camera, according to embodiments of this disclosure.

This disclosure also provides a method 200 of replacing a first swappable camera 26 with a second swappable camera 26. Referring to FIG. 9, a flowchart shows the method 200, which can include one or more of the following: at process block 202, removing the first swappable camera 26; at process block 204, positioning the second swappable camera 26 with a location and orientation of the first swappable camera 26 prior to the removing; at process block 206, determining a region of interest 16 that is centered about the desired central array point 12 using the alignment data 54; and at process block 208, acquiring an image using only pixels of the sensor array 10 that are located within the region of interest 16.

Referring to FIGS. 3-6, a user replacing a first swappable camera 26 having an aligned sensor array 10 as shown in FIG. 3 with a second swappable camera 26 having a misaligned sensor array 10 as shown in FIGS. 4-6 where the first and second swappable camera 26 are positioned and oriented identically would expect the following: that an image acquired with the second swappable camera 26 using the full field of vision of the sensor array 10 would not be aligned with an image acquired with the first swappable camera 26 using the full field of vision of the sensor array 10; and that an image acquired with the second swappable camera 26 using the region of interest 16 would be aligned with an image acquired with the first swappable camera 26 using the full field of vision of the sensor array 10. Similarly, a user replacing a first swappable camera 26 having a misaligned sensor 10 array and a first region of interest 16 that is centered about the desired central array point 12 with a second swappable camera 26 having a second region of interest 16 that is different than the first region of interest 16 but is also centered about the desired central array point 12 (i.e., the first region of interest 16 and the second region of interest 16 are concentric) would expect that an image acquired with the first swappable camera 26 using the first region of interest 16 and an image acquired with the second swappable camera 26 using the second region of interest 16 would be aligned with one another. In other words, by using a region of interest 16 that is centered about the desired central array point 12, a user can expect that an acquired image will be an image of the same image target as an image acquired from a different misaligned sensor array 10 using a region of interest 16 that is centered about the desired central array point 12.

Features of the vision system 20 and other methods 300 described herein are applicable to the method 200 of replacing a first swappable camera with a second swappable camera.

Method of Making a Swappable Camera

Figure 10:
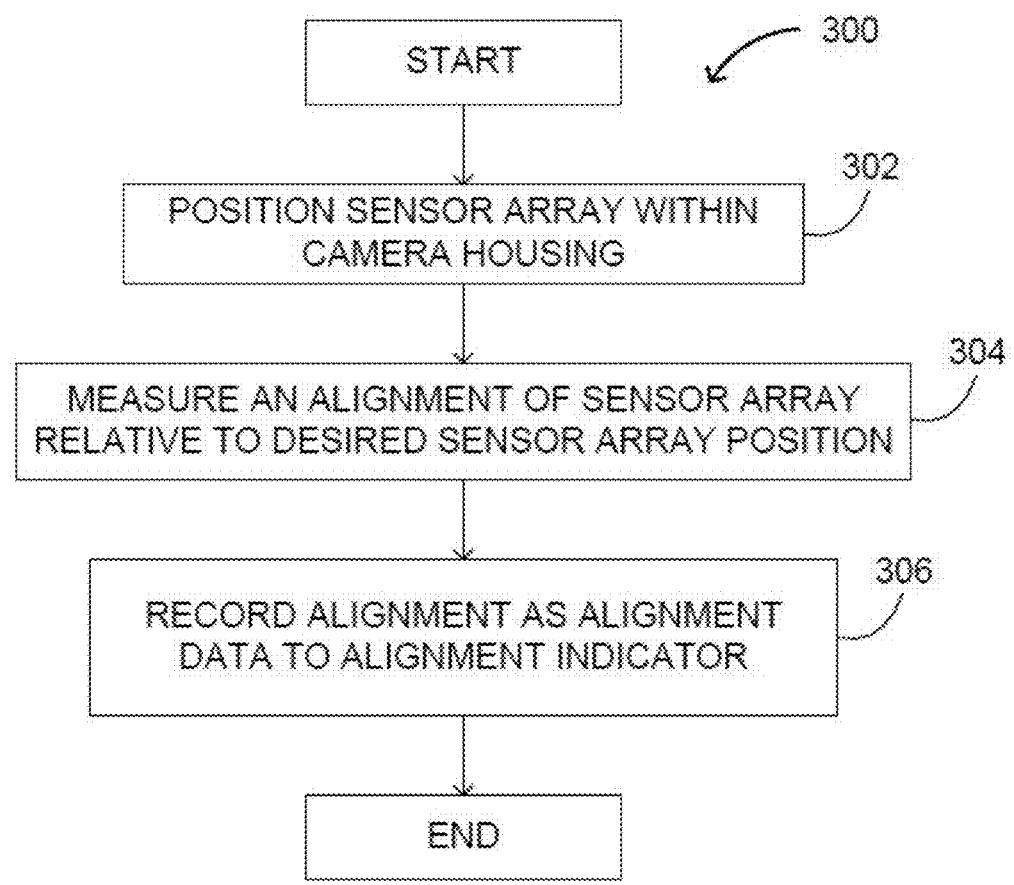
FIG. 10 is a flowchart showing a method of making a swappable camera, according to embodiments of this disclosure.

This disclosure further provides a method 300 of making a swappable camera. Referring to FIG. 10, a flowchart shows the method 300 can include one or more of the following: at process block 302, positioning a sensor array 10 within the camera housing 34; at process block 304, measuring an alignment of the sensor array 10 relative to the desired sensor array location 18; and recording the alignment as alignment data 54 to an alignment indicator 38 of the swappable camera 26. Positioning the sensor array 10 within the camera housing 34 can be performed in a manufacturing process that positions the sensor array 10 within the camera housing 34 with a manufacturing variance of at least about 50 µm, at least about 100 µm, at least about 250 µm, or at least about 500 µm. The manufacturing variance can be at least about 10 pixels, at least about 25 pixels, at least about 50 pixels, at least about 100 pixels, or at least about 200 pixels.

Measuring an alignment of the sensor array 10 relative to the desired sensor array location 18 can be achieved by methods known to those having ordinary skill in the art. For example, the alignment of the sensor array 10 relative to the desired sensor array location 18 can be measured by laser imaging the sensor array 10 and camera housing 34 to measure the alignment, acquiring an image of a known target using the swappable camera 26 and determining the alignment based on a distortion of the acquired image that is caused by misalignment, or a combination thereof.

In certain embodiments, the method 300 can include determining a region of interest 16 that is centered about the desired central array point 12. Determining the region of interest 16 can include maximizing the size of the region of interest 16.

Features of the vision system 20 and other methods 200 described herein are applicable to the method 300 of making a swappable camera.

Although the present technology has been described with reference to preferred embodiments, workers skilled in the art will recognize that changes may be made in form and detail without departing from the spirit and scope of the technology.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A vision system comprising:
   an image processor; and
   a swappable camera including a camera housing and an optical arrangement,
   the optical arrangement comprising a sensor array,
   the sensor array electronically coupled to the image processor,
   the swappable camera including an alignment indicator storing alignment data representative of an array-housing alignment of the sensor array relative to the camera housing,
   the image processor determines a region of interest of the sensor array using the alignment data,
   the image processor determines the region of interest by a process that includes maximizing a size of the region of interest within the sensor array to overlap with a concentric region of a desired sensor array position, and
   the image processor acquires an image of an image target using an auto-aligned mode wherein the image is acquired using only pixels located within the region of interest of the sensor array.

2. The vision system of claim 1, wherein the image processor acquires an image of the image target using one or more other image modes.

3. The vision system of claim 2, wherein the image is acquired in the one or more other image modes using pixels located outside the region of interest of the sensor array.

4. The vision system of claim 2, wherein the image processor is operable to switch between the auto-aligned mode and the one or more other image modes.

5. The vision system of claim 1, wherein the alignment data comprises a sensor offset of the sensor relative to a desired sensor alignment.

6. The vision system of claim 5, wherein the sensor offset includes an offset distance, an offset direction, or a combination thereof.

7. The vision system of claim 1, wherein the alignment data comprises an angular alignment value including a sensor angle of the sensor array relative to the desired sensor array position.

8. The vision system of claim 1, the vision system further comprising a mount, the camera housing coupled to the mount.

9. The vision system of claim 8, the mount including a mount-side mounting contact and the camera housing including a camera-side mounting contact.

10. The vision system of claim 9, wherein the camera-side mounting contact couples with the mount-side mounting contact to reproducibly position the swappable camera so a desired central array point of the swappable camera is located in substantially the same location before and after swapping the swappable camera.

11. The vision system of claim 9, wherein the camera-side mounting contact couples with the mount-side mounting contact to reproducibly position the swappable camera so a primary optical axis of the swappable camera is pointed toward the image target before and after swapping the swappable camera.

12. The vision system of claim 9, the camera housing defining a housing angle defining the rotational orientation of the camera housing about a primary optical axis of the swappable camera, wherein the camera-side mounting contact couples with the mount-side mounting contact to reproducibly orient the swappable camera so the housing angle is substantially the same before and after swapping the swappable camera.

13. The vision system of claim 1, the optical arrangement further comprising a lens assembly coupled to the camera housing.

14. The vision system of claim 13, wherein the vision system is configured such that a primary optical axis of the swappable camera contacts the image target, the lens assembly, and the sensor array.

15. The vision system of claim 1, wherein the alignment indicator comprises memory.

16. The vision system of claim 1, the vision system further comprising an alignment indicator reader.

17. The vision system of claim 16, wherein the alignment indicator reader identifies the alignment data from the alignment indicator, and wherein the image processor or alignment indicator reader interprets the alignment data to provide the array-housing alignment.

18. A method of replacing a first swappable camera with a second swappable camera, the second swappable camera comprising a camera housing, a sensor array, and an alignment indicator storing alignment data representative of an array-housing alignment of the sensor array relative to a desired sensor array position within the camera housing, the sensor array is offset by at least one pixel from the desired sensor array position, the method comprising:
  removing the first swappable camera;
  positioning the second swappable camera with a location and orientation of the first swappable camera prior to the removing;
  determining a region of interest that is concentric with the desired sensor array position using the alignment data, wherein determining the region of interest includes maximizing a size of the region of interest within the sensor array to overlap with a concentric region of the desired sensor array position; and
  acquiring an image using only pixels of the sensor array that are located within the region-of-interest.

19. A method of making a swappable camera comprising a camera housing having a desired sensor array location, the method comprising:
  positioning a sensor array within the camera housing;
  measuring an alignment of the sensor array relative to the desired sensor array location;
  determining a region of interest that is concentric with the desired sensor array location, wherein determining the region of interest includes maximizing a size of the region of interest within the sensor array to overlap with a concentric region of the desired sensor array location; and
  recording the alignment as alignment data to an alignment indicator of the swappable camera,
  wherein positioning the sensor array within the camera housing is performed in a manufacturing process that positions the sensor array within the camera housing with a manufacturing variance of at least 50 µm.

20. The method of claim 19, wherein measuring the alignment of the sensor array relative to the desired sensor array position includes laser imaging the sensor array and camera housing to measure the alignment.

21. The method of claim 19, wherein measuring the alignment of the sensor array relative to the desired sensor array position includes
  acquiring an image of a known target using the swappable camera and determining the alignment based on a distortion of the acquired image that is caused by misalignment.

22. The method of claim 18, the method further comprising acquiring a second image using pixels that are located outside the region of interest.

* * * * *